United States Patent
Feng et al.

(10) Patent No.: US 11,545,161 B2
(45) Date of Patent: Jan. 3, 2023

(54) WIRELESS COMMUNICATION DEVICE, AND METHOD AND APPARATUS FOR PROCESSING VOICE DATA

(71) Applicant: Yealink (XIAMEN) Network Technology Co., Ltd., Fujian (CN)

(72) Inventors: Wanjian Feng, Fujian (CN); Bingyang Zeng, Fujian (CN); Zhipeng Lin, Fujian (CN)

(73) Assignee: Yealink (XIAMEN) Network Technology Co., Ltd., Fujian (CN)

( * ) Notice: Subject to any disclaimer, the term of this patent is extended or adjusted under 35 U.S.C. 154(b) by 0 days.

(21) Appl. No.: 17/240,577

(22) Filed: Apr. 26, 2021

(65) Prior Publication Data

US 2021/0335370 A1    Oct. 28, 2021

(30) Foreign Application Priority Data

Apr. 26, 2020    (CN) .......................... 202010337817.3

(51) Int. Cl.
*H04B 1/3827*    (2015.01)
*G10L 19/012*    (2013.01)
(Continued)

(52) U.S. Cl.
CPC .............. *G10L 19/012* (2013.01); *H04B 1/40* (2013.01); *H04L 65/70* (2022.05)

(58) Field of Classification Search
CPC ....... G10L 19/012; H04B 1/40; H04B 1/3833; H04L 65/607; H04L 65/80; H04L 65/70;
(Continued)

(56) References Cited

U.S. PATENT DOCUMENTS 5,594,717 A * 1/1997 Watanabe ........... H04L 49/3081
370/395.2
6,097,760 A * 8/2000 Spicer ................. H03M 7/3044
375/244
(Continued)

FOREIGN PATENT DOCUMENTS

CN    205265758 U    5/2016
CN    106027541 A    10/2016
(Continued)

OTHER PUBLICATIONS

Communication pursuant to Article 94(3) EPC for European Patent Application No. 21170234.5 issued by the European Patent Office dated Oct. 6, 2021.
(Continued)

*Primary Examiner* — Kenneth T Lam
(74) *Attorney, Agent, or Firm* — IP & T Group LLP

(57) ABSTRACT

The disclosure provides a wireless communication device and a method and apparatus for processing voice data. The wireless communication device includes: a radio frequency chip and a computing power chip. The radio frequency chip includes: a first processor and a radio frequency transceiver. The radio frequency chip and the computing power chip are connected via a preset communication interface, so that the first processor communicates with a second processor in the computing power chip, wherein the second processor is configured to: perform a processing of decoding data received by the radio frequency transceiver and encoding data to be sent for the radio frequency transceiver to send. The computing power chip is provided in the wireless communication device, and a codec with a good processing effect is supported by the second processor, thus the effect of the encoding or decoding processing may be improved.

17 Claims, 3 Drawing Sheets

(51) Int. Cl.
*H04B 1/40* (2015.01)
*H04L 65/70* (2022.01)

(58) Field of Classification Search
CPC .. H04M 1/2535; H04M 1/6066; H04M 7/006; H04M 2250/08
See application file for complete search history.

(56) References Cited

U.S. PATENT DOCUMENTS

| | | | |
|---|---|---|---|
| 6,574,280 B1 | 6/2003 | Liau et al. | |
| 6,600,740 B1* | 7/2003 | Valentine | H04L 1/0014 370/255 |
| 7,787,529 B2* | 8/2010 | Cheng | G10L 19/00 375/220 |
| 2014/0120852 A1* | 5/2014 | Ash | H04B 1/0458 455/127.1 |
| 2014/0287785 A1* | 9/2014 | Ash | H04M 1/73 455/464 |
| 2014/0362839 A1* | 12/2014 | Fukuda | H04W 84/045 370/338 |
| 2017/0078467 A1* | 3/2017 | Fukuda | H04M 1/725 |
| 2018/0268833 A1* | 9/2018 | Zhao | G10H 1/361 |
| 2019/0110168 A1* | 4/2019 | Wong | H04W 4/16 |
| 2019/0215729 A1* | 7/2019 | Oyman | H04L 5/0082 |

FOREIGN PATENT DOCUMENTS

| | | |
|---|---|---|
| CN | 106209203 A | 12/2016 |
| WO | 2019/062541 A1 | 4/2019 |

OTHER PUBLICATIONS

The Second Office Action for Chinese Patent Application No. 202010337817.3 issued by the Chinese Patent Office dated Oct. 11, 2021.

* cited by examiner

WIRELESS COMMUNICATION DEVICE, AND METHOD AND APPARATUS FOR PROCESSING VOICE DATA

CROSS REFERENCE TO RELATED APPLICATIONS

The present application claims the benefit of Chinese Patent Application No. CN202010337817.3 filed on Apr. 26, 2020, the contents of which are hereby incorporated by reference.

TECHNICAL FIELD

The present disclosure relates to the technical field of communications, and in particular, to a wireless communication device, and a method and apparatus for processing voice data.

BACKGROUND ART

With the development of science and technology, more and more various wireless communication devices come up. A radio frequency (RF) chip is usually provided in the wireless communication device, and the wireless communication device can implement the operations such as sending and reception of wireless communication data through the radio frequency chip.

In the related art, a processor is provided in the radio frequency chip. The processor itself implements the encoding and decoding functions, and the processor controls the corresponding elements and components to implement functions such as data reception and sending functions, analog-to-digital conversion, and digital-to-analog conversion.

However, in the related art, the implementation of multiple functions is controlled by the processor of the radio frequency chip, thus the processor of the radio frequency chip has an increased processing load, bringing problems of poor encoding or decoding processing effect and difficulty in improving the processing effect.

SUMMARY

In view of the above-mentioned deficiencies in the prior art, an object of the present disclosure is to provide a wireless communication device, and a problems of poor encoding or decoding processing effect and difficulty in improving the processing effect in the related art due to increased processing load of the processor of the radio frequency chip by which the implementation of multiple functions is controlled.

To achieve the above object, the following technical solutions are employed in some embodiments of the present disclosure:

In a first aspect, an embodiment of the present disclosure provides a wireless communication device. The wireless communication device includes: a radio frequency chip and a computing power chip;

the radio frequency chip includes a first processor and a radio frequency transceiver, the first processor is connected with the radio frequency transceiver, and the first processor is configured to control sending and reception of the radio frequency transceiver; the computing power chip includes a second processor; the radio frequency chip and the computing power chip are connected via a preset communication interface, so that the first processor communicates with the second processor;

wherein the second processor is configured to: perform a processing of decoding first encoded voice data received by the radio frequency transceiver to obtain decoded voice data; and perform a processing of encoding voice data to be sent to obtain second encoded voice data, and transmit the second encoded voice data to the radio frequency transceiver for sending the second encoded voice data.

Optionally, the wireless communication device further includes a converter and a voice player, wherein the converter is connected with each of the second processor and the voice player;

the converter is configured to perform digital-to-analog conversion on the decoded voice data decoded by the second processor so as to obtain analog voice data to be played, which is then played by the voice player.

Optionally, the wireless communication device further includes: a voice capturer; the converter is also connected with the voice capturer;

the converter is further configured to perform analog-to-digital conversion on analog voice data acquired by the voice capturer so as to obtain the voice data to be sent, and transmit the voice data to be sent to the second processor.

Optionally, the converter is located on the computing power chip;

a digital input end of the converter is connected with the second processor, and an analog output end of the converter is connected with the voice player;

an analog input end of the converter is also connected with the voice capturer, and a digital output end of the converter is also connected with the second processor.

Optionally, the converter is located on the radio frequency chip;

a digital input end and a digital output end of the converter are connected with the first processor of the radio frequency chip, respectively, so that the converter communicates with the second processor on the computing power chip;

an analog output end of the converter is connected with the voice player, and an analog input end of the converter is also connected with the voice capturer.

Optionally, the second processor is configured to perform noise reduction and/or echo cancellation on the voice data to be sent and then encoding the voice data to be sent.

Optionally, the preset communication interface is a serial peripheral interface (SPI) or a time division multiplexing (TDM) interface.

Optionally, the radio frequency chip is further configured to control the computing power chip to stop or start an encoding or decoding process.

Optionally, the radio frequency transceiver performs wireless communication according to any one of the following communication standards: DECT (Digital Enhanced Cordless Telecommunications), Bluetooth, Wireless Fidelity (WiFi), Global System for Mobile Communications (GSM), Long Term Evolution (LTE), World Interoperability for Microwave Access (Wimax), Third Generation Mobile Networks (3G), the 4th Generation Mobile Networks (4G), and the 5th Generation Mobile Networks (5G).

Optionally, the wireless communication device is a DECT base station, a DECT headset, or a DECT handset.

In a second aspect, an embodiment of the present disclosure further provides a method for processing voice data, which is applicable to the second processor in some of the wireless communication devices according to the first aspect described above. The method includes:

receiving first encoded voice data from the radio frequency transceiver;

performing a processing of decoding the first encoded voice data to obtain decoded voice data;

performing a processing of encoding voice data to be sent to obtain second encoded voice data; and transmitting the second encoded voice data to the radio frequency transceiver for sending the second encoded voice data.

Optionally, the method further includes:

receiving a codec start instruction sent by the first processor, wherein the codec start instruction is sent by the first processor when the first processor receives a call establishment request; and starting a processing of encoding or decoding voice data according to the codec start instruction.

Optionally, the method further includes:

receiving a codec stop instruction sent by the first processor, wherein the codec stop instruction is sent by the first processor when the first processor receives a call end request; and stopping a processing of encoding or decoding voice data according to the codec stop instruction.

Optionally, performing the processing of encoding voice data to be sent to obtain second encoded voice data includes:

performing noise reduction and/or echo cancellation on the voice data to be sent and then encoding the voice data to be sent so as to obtain the second encoded voice data.

In a third aspect, an embodiment of the present disclosure further provides an apparatus for processing voice data, which is applicable to the second processor in some of the wireless communication devices according to the first aspect describe above. The apparatus includes:

a receiving module configured to receive first encoded voice data from the radio frequency transceiver;

a decoding module configured to perform a processing of decoding the first encoded voice data to obtain decoded voice data;

an encoding module configured to perform a processing of encoding voice data to be sent to obtain second encoded voice data; and a transmission module configured to transmit the second encoded voice data to the radio frequency transceiver for sending the second encoded voice data.

Optionally, the apparatus further includes:

a first receiving module configured to receive a codec start instruction sent by the first processor, wherein the codec start instruction is sent by the first processor when the first processor receives a call establishment request; and a start module configured to start a processing of encoding or decoding voice data according to the codec start instruction.

Optionally, the apparatus further includes:

a second receiving module configured to receive a codec stop instruction sent by the first processor, wherein the codec stop instruction is sent by the first processor when the first processor receives a call end request; and a stop module configured to stop a processing of encoding or decoding voice data according to the codec stop instruction.

Optionally, the encoding module is further configured to perform noise reduction and/or echo cancellation on the voice data to be sent and then perform encoding on the voice data to be sent so as to obtain the second encoded voice data.

The present disclosure has the following advantageous effects:

The embodiments of the present disclosure provide a wireless communication device, and a method and apparatus for processing voice data. The wireless communication device includes: a radio frequency chip and a computing power chip. The radio frequency chip includes: a first processor and a radio frequency transceiver, wherein the first processor is connected with the radio frequency transceiver, and the first processor is configured to control the radio frequency transceiver to receive and send data. The computing power chip includes a second processor. The radio frequency chip and the computing power chip are connected via a preset communication interface, so that the first processor communicates with the second processor, wherein the second processor is configured to: perform a processing of decoding first encoded voice data received by the radio frequency transceiver to obtain decoded voice data; and perform a processing of encoding voice data to be sent to obtain second encoded voice data and transmit the second encoded voice data to the radio frequency transceiver for sending the second encoded voice data. A computing power chip is provided in the wireless communication device. The second processor of the computing power chip performs a processing of decoding the first encoded voice data and performs a processing of encoding voice data to be sent. A novel codec is supported by the second processor of the computing power chip. thus the effect of the encoding or decoding processing can be improved.

BRIEF DESCRIPTION OF DRAWINGS

In order to more clearly illustrate technical solutions of embodiments of the present disclosure, drawings required for use in the embodiments will be described briefly below. It is to be understood that the drawings below are merely illustrative of some embodiments of the present disclosure, and therefore should not be considered as limiting its scope. It will be understood by those of ordinary skill in the art that other relevant drawings can also be obtained from these drawings without any inventive effort.

DETAILED DESCRIPTION OF EMBODIMENTS

In order to further clarify the objects, technical solutions, and advantages of the embodiments of the present disclosure, the technical solutions of the embodiments of the present disclosure will be described below clearly and completely with reference to the drawings of the embodiments of the present disclosure. It is apparent that the embodiments to be described are some, but not all of the embodiments of the present disclosure.

A wireless communication device according to each of the following embodiments of the present disclosure may be a wireless terminal device, or may be a wireless network device such as a base station. The wireless communication devices according to the embodiments of the present disclosure and the method and apparatus for processing voice data therein will be described with reference to multiple embodiments as follows.

Here, the wireless communication device may also be called as a DECT (Digital Enhanced Cordless Telecommunications) device, and a radio frequency chip described below may also be called as a DECT communication chip.

Figure 1:
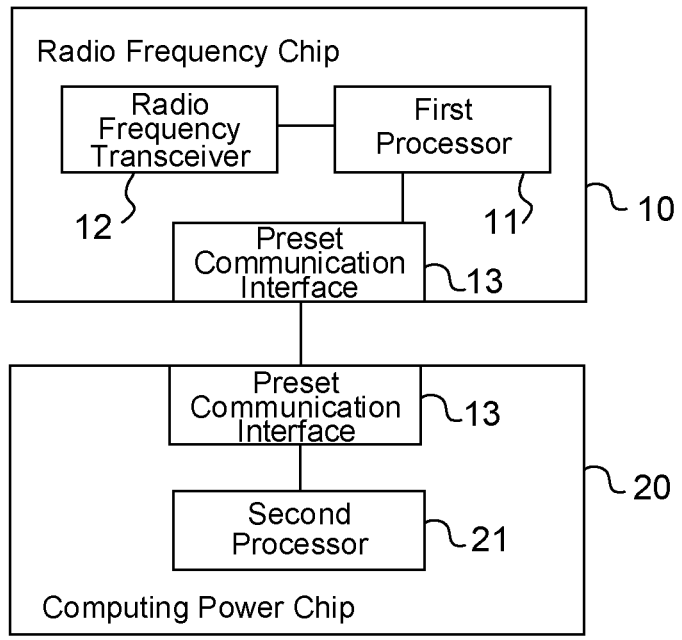
FIG. 1 is a schematic structural diagram of a wireless communication device according to an embodiment of the present disclosure.

FIG. 1 is a schematic structural diagram of a wireless communication device according to an embodiment of the present disclosure. As shown in FIG. 1, the wireless communication device may include: a radio frequency chip 10 and a computing power chip 20.

The radio frequency chip may include: a first processor 11 and a radio frequency transceiver 12, wherein the first processor 11 is connected with the radio frequency transceiver 12, and the first processor 11 is configured to control sending and reception of the radio frequency transceiver 12. The computing power chip 20 may include: a second processor 21. The radio frequency chip 10 and the computing power chip 20 are connected via a preset communication interface 13, so that the first processor 11 communicates with the second processor 21.

Here, the second processor 21 is configured to: perform a processing of decoding first encoded voice data received by the radio frequency transceiver 12 to obtain decoded voice data; and perform a processing of encoding voice data to be sent, so as to obtain second encoded voice data and transmit the second encoded voice data to the radio frequency transceiver 12 for sending the second encoded voice data.

In an embodiment of the present disclosure, the first processor 11 is connected with a preset communication interface 13 on the radio frequency chip 10. The second processor 21 may also be connected with the preset communication interface 13 on the computing power chip 20. The preset communication interface 13 on the radio frequency chip 10 is connected with the preset communication interface 13 of the computing power chip 20.

In some embodiments, the radio frequency chip 10 may receive the first encoded voice data, and the first processor 11 may directly send the first encoded voice data received by the radio frequency chip 10 to the second processor 21. Evidently, the first processor 11 may also process the first encoded voice data received by the radio frequency chip 10 and send the processed first encoded voice data to the second processor 21, and the second processor 21 may receive the processed first encoded voice data.

At least one type of codec (coder-decoder) may be preset in the second processor 21. Each codec is a program code. Evidently, the codec may also be a hardware codec built in the computing power chip 20. After the first processor 11 sends the first encoded voice data received by the radio frequency chip 10 to the second processor 21, the second processor 21 may acquire the first encoded voice data, and the second processor 21 may determine the first encoded voice data as encoded data and decodes the first encoded voice data using the preset codec to obtain decoded voice data, so that an execution device may perform corresponding processing according to the decoded voice data.

For example, the codec may be a novel voice codec algorithm that may support a high-compression-ratio encoder to achieve broadband (wideband) voice having multiple channels and a preset code rate, which, for example, may be 32 kbps (bit rate). The novel voice codec algorithm may be Opus algorithm or G.722.1 algorithm. Audio quality can be improved and multi-channel broadband voice communication can be achieved by encoding and decoding voice data based on the novel voice codec algorithm. The encoding process is a compression process. A compression ratio of ⅛ is required in order to achieve broadband voice transmission through 8 or more channels, at which 320 bytes of PCM (Pulse Code Modulation) data can be compressed to 40 bytes, and finally broadband voice transmission is implemented at a bit rate of 32 kbps. Therefore, the number of broadband audio channels can be expanded.

In addition, the second processor 21 may acquire voice data to be sent. If the voice data to be sent is determined to be decoded data, the second process 21 encodes the voice data to be sent to obtain second encoded voice data, and sends the second encoded voice data to the first processor 11 through the communication interface. The first processor 11 controls the radio frequency transceiver 12 to send the second encoded voice data if the second encoded voice data is determined to be encoded data.

Optionally, the wireless communication device may be a terminal device such as a DECT headset (or earphone) or a DECT handset, or may be a wireless network device such as a DECT base station, or certainly may be any other device capable of wireless voice communication, which is not specifically limited in the embodiment of the present disclosure.

For example, when the wireless communication device is a wireless headset, the first processor 11 may be an ARM (Advanced RISC (Reduced Instruction Set Computing) Machines) processor, the radio frequency transceiver 12 may be a DECT-RF (Digital Enhanced Cordless Telecommunications-Radio Frequency) transceiver, the second processor 21 may be a DSP (Digital Signal Processor), and the converter may be an ADC&DAC SOC chip (an integrated circuit chip for analog-to-digital conversion and digital-to-analog conversion). Evidently, the analog-to-digital conversion and digital-to-analog conversion may occur on two different circuit chips, wherein the circuit chip having an analog-to-digital converter can achieve the analog-to-digital conversion function, and the circuit chip having a digital-to-analog converter can achieve the digital-to-analog conversion function. The codec may be LC3plus (a voice codec algorithm).

As described above, an embodiment of the present disclosure provides a wireless communication device including: a radio frequency chip and a computing power chip. The radio frequency chip includes: a first processor and a radio frequency transceiver, wherein the first processor is connected with the radio frequency transceiver, and the first processor is configured to control the sending and reception of the radio frequency transceiver to receive and send. The computing power chip includes a second processor. The radio frequency chip and the computing power chip are connected via preset communication interfaces, so that the first processor communicates with the second processor, wherein the second processor is configured to: perform a processing of decoding first encoded voice data received by the radio frequency transceiver to obtain decoded voice data; and perform a processing of encoding voice data to be sent to obtain second encoded voice data and transmit the second encoded voice data to the radio frequency transceiver for sending the second encoded voice data. The computing power chip is provided in the wireless communication device. The second processor of the computing power chip is configured to perform a processing of decoding the first encoded voice data and perform a processing of encoding voice data to be sent. The second processor supports processing using a codec with a good processing effect, thus the effect of the encoding or decoding processing can be improved, so that the instructions for voice communication can be improved.

Moreover, a wireless communication device according to an embodiment of the present disclosure is also improved in computing power, enabling a voice call can be made by the wireless communication device to have better audio quality and effect in the uplink and downlink.

Optionally, the wireless communication device further includes a converter 30 and a voice player 40, wherein the converter 30 is connected with each of the second processor 21 and the voice player 40. For example, the voice player 40 may be a speaker.

Here, the wireless communication device may be a wireless terminal device, and the converter 30 is configured to perform digital-to-analog conversion on the decoded voice data which is decoded by the second processor 21 so as to obtain analog voice data to be played, which is then played by the voice player 40.

In some embodiments, the second processor 21 is configured to process the first encoded voice data to obtain decoded voice data. The converter 30 may acquire the decoded voice data and perform digital-to-analog conversion on the decoded voice data to obtain analog voice data to be played. The converter 30 may send the analog voice data to be played to the voice player 40. The voice player 40 may receive and play the analog voice data to be played. In addition, the decoded voice data may be PCM data.

Optionally, the wireless communication device further includes a voice capturer 50, wherein the converter 30 is also connected with the voice capturer 50. For example, the voice capturer 50 may be a microphone.

Here, the wireless communication device may be a wireless terminal device, and the converter 30 is further configured to perform analog-to-digital conversion on analog voice data acquired by the voice capturer 50 to obtain voice data to be sent, and transmit the voice data to be sent to the second processor 21.

In an embodiment of the present disclosure, when the user utters a voice, the voice capturer may capture analog voice data and send the analog voice data to the converter. The converter may receive the analog voice data and convert the analog voice data to voice data to be sent. The voice data to be sent is digital voice data. The converter may send the voice data to be sent to the second processor 21. The second processor 21 may receive the voice data to be sent, and then the second processor 21 may determine the voice data to be sent as decoded data, and encode the voice data to be sent.

It should be noted that the procedure of analog-to-digital conversion means digitizing (discretizing) analog and continuous voice audio waveforms to obtain digital voice data. The digitalization may include processes such as sampling, quantization, and encoding, followed by recording, transmission, and other processing. The process of digital-to-analog conversion means restoring these recorded digital voice data into analog voice data to obtain continuous sound.

Here, the sampling means replacing the original signal which is continuous in time with a sequence of signal sample values at preset time intervals. The quantization is to approximately represent the original amplitude value continuously varying with time by using a limited number of amplitudes to change the continuous amplitude of the analog signal into a preset number of discrete values at preset time intervals. The encoding is intended to express the quantized discrete values with binary digits according to a certain rule.

In an embodiment of the present disclosure, when the wireless communication device is a wireless network device such as a base station, the second processor 21 of the computing power chip 20 may be connected with a network interface. The base station may communicate with a wireless terminal device via the radio frequency transceiver 12. The base station may perform network communication with a remote VOIP (Voice over Internet Protocol) device (e.g., a base station) via the network interface. The base station may decode the encoded data by using the second processor 21 and then transmit it to another remote VOIP device (e.g., a base station) via the network so as to achieve the transmission of voice data.

In some possible examples, the converter 30 in the wireless communication device described above may be provided in the computing power chip 20 or the radio frequency chip, which will be explained separately as follows.

Figure 2:
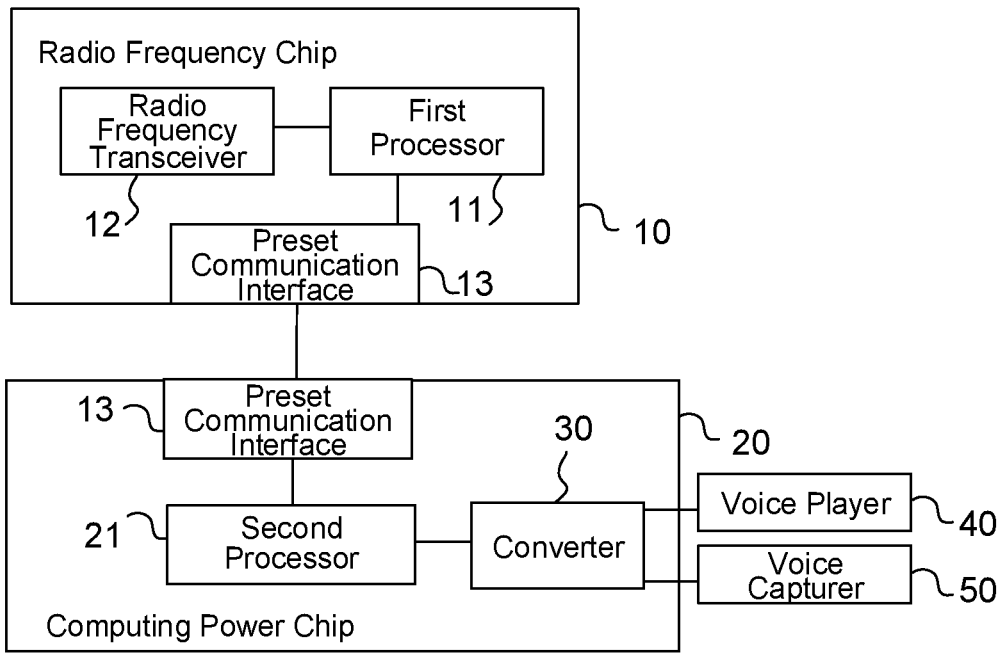
FIG. 2 is a schematic structural diagram of a wireless communication device according to an embodiment of the present disclosure.

Optionally, FIG. 2 is a schematic structural diagram of a wireless communication device according to an embodiment of the present disclosure. As shown in FIG. 2, if the second processor 21 of the computing power chip 20 is configured to send decoded voice data to the converter 30, or if the second processor 21 of the computing power chip 20 is configured to receive the voice data to be sent which is output by the converter 30, the converter 30 may be located on the computing power chip 20.

Here, a digital input end of the converter 30 is connected with the second processor 21, and an analog output end of the converter 30 is connected with the voice player 40. An analog input end of the converter 30 is also connected with the voice capturer 50, and a digital output end of the converter 30 is connected with the second processor 21.

If the converter 30 is located on the computing power chip 20, when the radio frequency transceiver 12 receives first encoded voice data, the first processor 11 may directly send the first encoded voice data received by the radio frequency chip 10 to the second processor 21. The second processor 21 may acquire the first encoded voice data, decode the first encoded voice data to obtain decoded voice data, and send the decoded voice data to the digital input end of the converter 30. The converter 30 may receive the decoded voice data, perform digital-to-analog conversion on the decoded voice data to obtain analog voice data to be played, and output the analog voice data to be played from the analog output end to the voice player 40. The voice player 40 may play voice according to the analog voice data to be played.

In addition, when the user utters a voice, the voice capturer 50 may capture analog voice data and send the analog voice data to the analog input end of the converter 30. The converter 30 may receive the analog voice data and perform analog-to-digital conversion on the analog voice data to obtain voice data to be sent, and then send the voice data to be sent to the second processor 21 through the digital output end. The second processor 21 may receive the voice data to be sent. If the voice data to be sent is determined to be decoded data, the second processor 21 may encode the voice data to be sent to obtain second encoded voice data, and then send the second encoded voice data to the first processor 11 through the preset communication interface 13.

The first processor 11 is configured to control the radio frequency transceiver 12 to send the second encoded voice data if the second encoded voice data is determined to be encoded data by the first processor 11.

Figure 3:
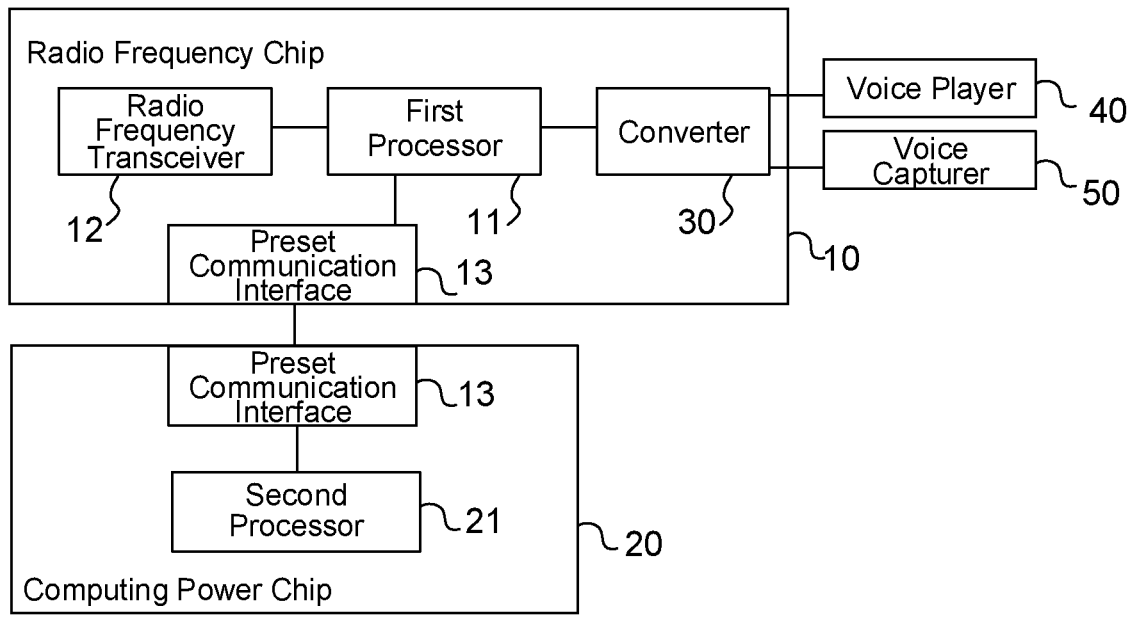
FIG. 3 is a schematic structural diagram of a wireless communication device according to an embodiment of the present disclosure.

Optionally, FIG. 3 is a schematic structural diagram of a wireless communication device according to an embodiment of the present disclosure. As shown in FIG. 3, if the first processor 11 of the radio frequency chip 10 is configured to send decoded voice data to the converter 30, or if the first processor 11 of the radio frequency chip 10 is designed to receive the voice data to be sent which is output by the converter 30, the converter 30 is located on the radio frequency chip 10.

The digital input end and the digital output end of the converter 30 are connected with the first processor 11 on the radio frequency chip 10, respectively, so that the converter 30 communicates with the second processor 21 on the computing power chip 20. The analog output end of the converter 30 is connected with the voice player 40, and the analog input end of the converter 30 is also connected with the voice capturer 50.

In some embodiments, when the radio frequency transceiver 12 receives first encoded voice data, the first processor 11 may send the first encoded voice data received by the radio frequency chip 10 to the second processor 21. The second processor 21 may acquire the first encoded voice data and decode the first encoded voice data to obtain decoded voice data, and the second processor 21 may send the decoded voice data to the first processor 11 through the communication interface. The first processor 11 sends the decoded voice data to the digital input end of the converter 30 if the decoded voice data is determined to be decoded data. The converter 30 may receive the decoded voice data, perform digital-to-analog conversion on the decoded voice data to obtain analog voice data to be played, and output the analog voice data to be played from the analog output end to the voice player 40. The voice player 40 may play voice according to the analog voice data to be played.

In addition, when the user utters a voice, the voice capturer 50 may capture analog voice data and send the analog voice data to the analog input end of the converter 30. The converter 30 may receive the analog voice data and perform analog-to-digital conversion on the analog voice data to obtain voice data to be sent, and then send the voice data to be sent to the first processor 11 through the digital output end. The first processor 11 may send the voice data to be sent to the second processor 21 through the preset communication interface 13. The second processor 21 may receive the voice data to be sent. If the voice data to be sent is determined to be decoded data, the second processor 21 may encode the voice data to be sent to obtain second encoded voice data, and then send the second encoded voice data to the first processor 11 through the preset communication interface 13. The first processor 11 is configured to control the radio frequency transceiver 12 to send the second encoded voice data if the second encoded voice data is determined to be encoded data.

Optionally, the second processor 21 is specifically configured to perform noise reduction and/or echo cancellation (or elimination) on the voice data to be sent and then perform encoding on the voice data to be sent.

Here, the noise reduction and/or echo cancellation processing includes the following three cases: a noise reduction processing, an echo cancellation processing, and a combination of the noise reduction processing and the echo cancellation processing.

In an embodiment of the present disclosure, the wireless communication device may include a local (or proximal) voice capturer and a remote (or distal) voice capturer. The second processor 21 may determine the presence or absence of an input of voice data by calculating the energy captured by the local voice capturer and by the remote voice capturer. The second processor 21 may filter the voice data captured by the remote voice capturer using an adaptive FIR (Finite Impulse Response) filter to obtain filtered voice data. The filtered voice data is similar to the voice data captured by the local voice capturer. A difference between the filtered voice data and the voice data captured by the local voice capturer is calculated.

Then, the above-mentioned difference may be used as an input for an adaptive LMS (Least Mean Square) algorithm to update a coefficient of the adaptive FIR filter for subsequent processing of remote data. When the remote voice capturer captures voice data but the local voice capturer does not capture voice data, or when both the remote voice capturer and the local voice capturer capture voice data, or neither of them captures voice data, it is unnecessary to update the coefficient of the FIR filter. The above-mentioned difference may also be subjected to NLP (Non-Linear Programming) processing to generate comfort noise which is then sent to the other wireless communication device.

As described above, the processing load of the first processor 11 can be further reduced by performing the smart noise reduction and echo cancellation processing by the computing power chip 20. Moreover, since noise reduction for more noise samples requires longer time, the processing efficiency can also be improved by performing the smart noise reduction and echo cancellation processing by the computing power chip 20, so that the voice data from which noise is reduced and echo is cancelled can be transmitted in time to improve the user experience.

Optionally, the radio frequency chip 10 is further configured to control the computing power chip 20 to stop or start an encoding or decoding processing.

Here, the first processor 11 in the radio frequency chip 10 may control the second processor in the computing power chip 20 to stop or start the encoding or decoding processing.

Optionally, the radio frequency transceiver 12 performs wireless communication according to any one of the following communication standards: DECT, Bluetooth, WiFi (Wireless Fidelity), GSM (Global System for Mobile Communications), LTE (Long Term Evolution), Wimax (World Interoperability for Microwave Access), 3G (Third generation mobile networks), 4G (The 4th Generation mobile networks), and 5G (The 5th Generation mobile networks).

Optionally, the preset communication interface 13 may be a serial peripheral interface (SPI), or the preset communication interface 13 may be a TMD (Time Division Multiplexing) interface. Evidently, the preset communication interface 13 may be selected from other types of communication interfaces, such as a USB (Universal Serial Bus) interface and the like, which is not specifically limited in the embodiments of the present disclosure.

Figure 4:
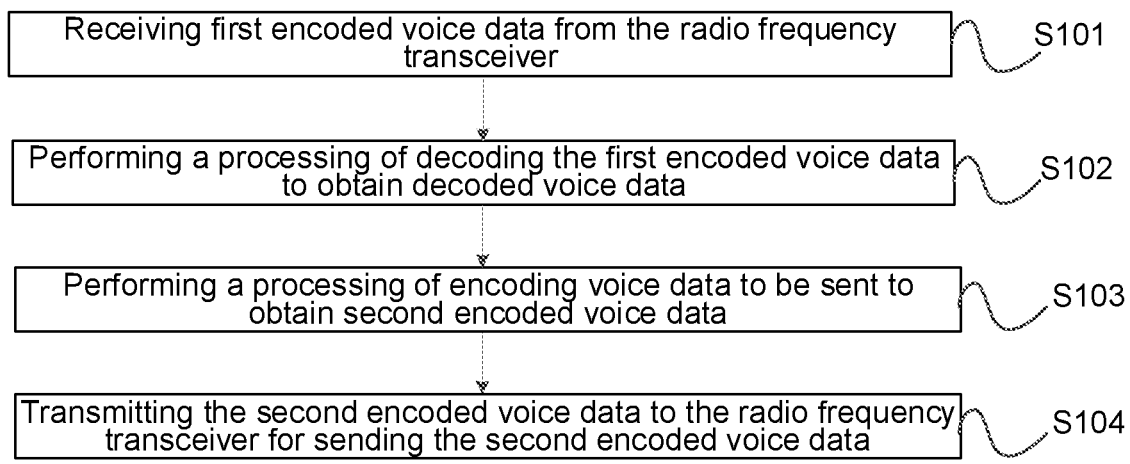
FIG. 4 is a schematic flowchart of a method for processing voice data according to an embodiment of the present disclosure.

An embodiment of the present disclosure may further provide a method for processing voice data applicable to the wireless communication device described above, which may be executed by the second processor in the to wireless communication device as described above in any one of FIGS. 1 to 3. FIG. 4 is a flowchart of a method for processing voice data according to an embodiment of the present disclosure. As shown in FIG. 4, the method may include steps of:

S101 of receiving first encoded voice data from the radio frequency transceiver;

S102 of performing a processing of decoding the first encoded voice data to obtain decoded voice data;

S103 of performing a processing of encoding voice data to be sent to obtain second encoded voice data; and S104 of transmitting the second encoded voice data to the radio frequency transceiver for sending the second encoded voice data.

Optionally, the process of S103 described above may include: performing processing of reducing noise and/or echo cancellation on the voice data to be sent and then encoding the voice data to be sent so as to obtain the second encoded voice data.

In the embodiment of the present disclosure, the method is implemented similarly to the wireless communication devices of FIGS. 1 to 3 described above in terms of the procedure, principle, and effects. Details thereof may be understood with reference to the above related description of the wireless communication devices of FIGS. 1 to 3 and therefore will not be repeated here.

Figure 5:
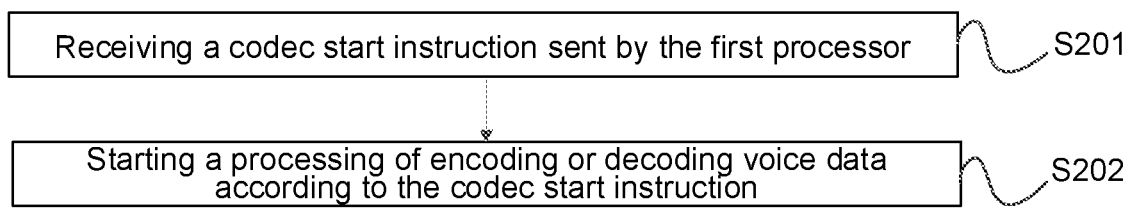
FIG. 5 is a schematic flowchart of a method for processing voice data according to an embodiment of the present disclosure.

Optionally, FIG. 5 is a schematic flowchart of a method for processing voice data according to an embodiment of the present disclosure. As shown in FIG. 5, the method may further include:

S201 of receiving a codec start instruction sent by the first processor, wherein the codec start instruction is sent by the first processor when the first processor receives a call establishment request; and S202 of enabling a processing of encoding or decoding voice data according to the codec start instruction.

Figure 6:
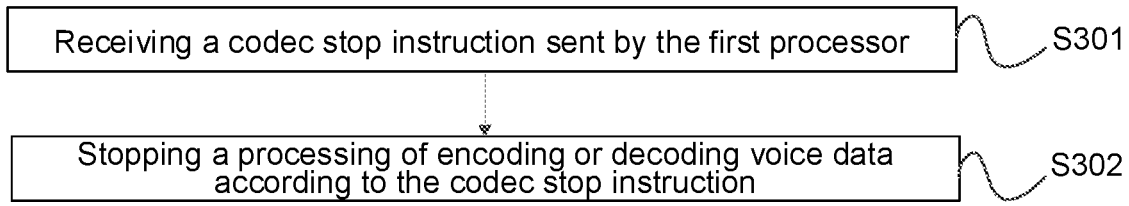
FIG. 6 is a schematic flowchart of a method for processing voice data according to an embodiment of the present disclosure.

Optionally, FIG. 6 is a flowchart of a method for processing voice data according to an embodiment of the present disclosure. As shown in FIG. 6, the method may further include:

S301 of receiving a codec stop instruction sent by the first processor, wherein the codec stop instruction is sent by the first processor when the first processor receives a call end request; and S302 of stopping the processing of encoding or decoding voice data according to the codec stop instruction.

In an embodiment of the present disclosure, if the first processor receives a call establishment request initiated by an upper layer service, the first processor may send a codec start instruction to the second processor, and the second processor may receive the codec start instruction. If the first processor receives a call end request initiated by the upper layer service, the first processor may send a codec stop instruction to the second processor, and the second processor may receive the codec stop instruction.

It should be noted that the first processor may control, based on a preset protocol corresponding to the preset communication interface, the second processor to start the codec according to a call establishment request initiated by an upper layer service, or control the second processor to stop the codec according to a call end request initiated by an upper layer service. For example, when the preset communication interface is an SPI interface, the preset protocol may be an SPI protocol.

For example, when the wireless communication device is a wireless handset, the first processor may send the first encoded voice data received by the radio frequency chip to the second processor, the second processor may acquire the first encoded voice data, and the second processor may determine whether to start or stop a voice data decoding process according to whether the first encoded voice data is acquired. The second processor may judge the number of bytes of the first encoded voice data to determine whether to decode the data. In addition, the procedure of the second processor processing the voice to be sent is similar to the procedure of the second processor processing the first encoded voice data described above, and therefore will not be repeated here. For instance, a data packet of 40 bytes represents encoded data, which should be decoded by the second processor, and a data packet of 320 bytes represents PCM audio data, which should be encoded by the second processor.

For example, when the wireless communication device is a wireless headset, the first processor may acquire the first encoded voice data received by the radio frequency transceiver, and package the first encoded voice data to obtain a data packet. Then, the first processor sends the packaged first encoded voice data to the second processor. The second processor may receive the packaged first encoded voice data and then start a voice data decoding processing. When the packaged first encoded voice data is not received, the voice data decoding processing is stopped. Here, each data packet may be defined as a combination of a control word, length, a check code, and voice data. The second processor may determine whether to start or stop the voice data decoding processing according to whether the first encoded voice data is acquired. The second processor may simultaneously also start an encoding processing function when starting the decoding processing function. When the second processor does not receive the voice data to be sent, an actual encoding processing is not performed although the encoding processing function is started. When the second processor does not acquire the first encoded voice data within a preset time period, the processing of encoding or decoding voice data may be stopped. For example, the preset time period may be 1 s (second) to 2 s.

For example, when the wireless communication device is a base station, the preset communication interface may be a TDM interface, and hence the preset communication protocol may be a TDM protocol, which may be used in the TDM128 mode at 16 k (sampling rate), 16 bit, and 8 channels. Here, a 16-bit data may consist of: 3 bits for encoder type+3 bits for channel number+2 bits for data packet type+8 bits for data. The second processor may determine whether to start or stop a voice data decoding processing according to whether the first encoded voice data is acquired. The second processor may also simultaneously start an encoding processing function when starting the decoding processing function. When the second processor does not receive the voice data to be sent, an actual encoding processing is not performed although the encoding processing function is started. When the second processor does not acquire the first encoded voice data within a preset time period, the processing of encoding or decoding voice data may be stopped by the second processor. For example, the preset time period may be 1 s (second) to 2 s.

In an embodiment of the present disclosure, the first processor may use the TDM128 protocol and perform a processing of filling the 16-bit data with an encoder type, a channel number, a data packet type, etc. Here, the data packet type is divided into three cases, where "1" represents a start of a packet, "2" represents a progress of a packet, and "3" represents an end of a packet. When the data packet type is 1, data buffering is started. In other words, the first processor controls the second processor to start a processing of encoding or decoding voice data. When the data packet type is 2, the buffering is continued. When the data packet type is 3, the packet buffering is ended. In other words, the first processor controls the second processor to stop the processing of encoding or decoding voice data.

In addition, if an error occurs in the data packet type, the second processor may truncate the data according to the size of the current buffered packet. If the data packet buffered is more than 40 bytes, it is indicated that the data packet is abnormal, and hence the current data packet is truncated, and it is determined that new data is to be received by a next data packet. If the data received by the second processor is less than or equal to 40 bytes but is of data packet type 3, it is meant that the transmission of the packet is finished so as to ensure the normal reception of the next data packet. This can ensure that the reception and processing of the subsequent data packets are not affected when the current data packet is abnormal.

Figure 7:
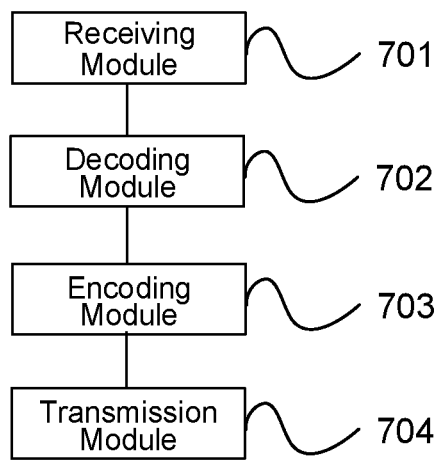
FIG. 7 is a schematic structural diagram of an apparatus for processing voice data according to an embodiment of the present disclosure.

FIG. 7 is a schematic structural diagram of an apparatus for processing voice data according to an embodiment of the present disclosure. As shown in FIG. 7, the apparatus is applicable to the second processor in the wireless communication device. The apparatus may include:

a receiving module 701 configured to receive first encoded voice data from the radio frequency transceiver;

a decoding module 702 configured to perform a processing of decoding the first encoded voice data to obtain decoded voice data;

an encoding module 703 configured to perform a processing of encoding voice data to be sent to obtain second encoded voice data; and a transmission module 704 configured to transmit the second encoded voice data to the radio frequency transceiver for sending the second encoded voice data.

Optionally, the apparatus further includes:

a first receiving module configured to receive a codec start instruction sent by the first processor, wherein the codec start instruction is sent by the first processor when the first processor receives a call establishment request; and a start module configured to start the processing of encoding or decoding voice data according to the codec start instruction.

Optionally, the apparatus further includes:

a second receiving module configured to receive a codec stop instruction sent by the first processor, wherein the codec stop instruction is sent by the first processor when the first processor receives a call end request; and a stop module configured to stop the processing of encoding or decoding voice data according to the codec stop instruction.

Optionally, the encoding module 703 is further configured to perform noise reduction and/or echo cancellation on the voice data to be sent and then perform encoding on the voice data to be sent so as to obtain second encoded voice data.

The apparatus described above is configured to execute the method according to the foregoing embodiment, and is implemented based on similar principles and achieves similar technical effects to those of the method, which will not be repeated here.

The above modules may be one or more integrated circuits configured to implement the above method, for example: one or more application specific integrated circuits (ASIC), or one or more microprocessors (e.g., digital signal processor, referred simply to as DSP), or one or more field programmable gate arrays (FPGA), or the like. For another example, when one of the above modules is implemented in the form of a program code for scheduling a processing element, the processing element may be a general-purpose processor, such as a central processing unit (CPU) or any other processor capable of invoking a program code. For another example, these modules may be integrated with each other and implemented in the form of a system-on-a-chip (SOC).

Figure 8:
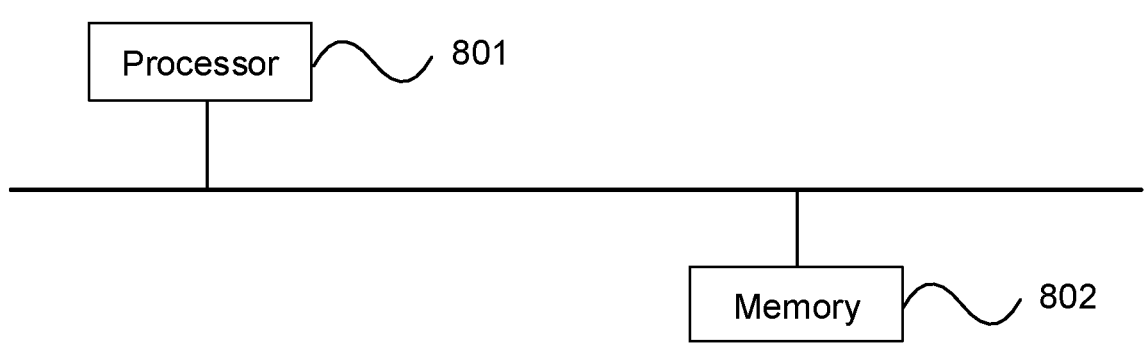
FIG. 8 is a schematic structural diagram of a computing power chip according to an embodiment of the present disclosure.

FIG. 8 is a schematic structural diagram of a computing power chip according to an embodiment of the present disclosure. As shown in FIG. 8, the computing power chip may include: a processor 801 and a memory 802.

The memory 802 is configured to store a program, and the processor 801 is configured to invoke the program stored in the memory 802 to execute any one of the above method embodiments illustrated in FIGS. 4 to 6. The specific implementation and technical effects thereof are similar to those described above, and therefore will not be repeated here.

Optionally, the present disclosure further provides a program product, for example, a computer-readable storage medium, including a program, which is configured to execute any one of the above method embodiments illustrated in FIGS. 4 to 6 when executed by a processor.

It should be understood that the disclosed apparatus and method, in several embodiments according to the present disclosure, may be implemented in other ways. For example, the embodiments of the apparatuses described above are merely illustrative in nature. For example, the units are divided only by logical functions, and additional division modes may be adopted in practical implementation. For instance, multiple units or components may be combined or integrated into another system, or some features may be omitted or not executed. In addition, the mutual coupling, or direct coupling or communication connection illustrated or discussed may be implemented via indirect coupling or communication between some communication interfaces, apparatuses or units, which may be electronic, mechanical or in other forms.

The units described as separate components may be or not be separated physically, and the components illustrated as units may be or not be physical units, namely, they may be located at one place or they may be distributed onto multiple network units. Some or all of the units may be selected as actually required to fulfill the purposes of the solutions of the present embodiments.

Besides, the individual functional units in the embodiments of the present disclosure may be integrated into one processing unit, or may be physically stand-alone, or two or more of the units may be integrated into one unit. The above-mentioned integrated units may be implemented in the form of hardware, or in the form of hardware plus software functional units.

The above-mentioned integrated units implemented in the form of software functional units may be stored in a computer-readable storage medium. The above-mentioned software functional units are stored in a storage medium, which includes a number of instructions for causing a computer device (which may be a personal computer, a server, a network device, or the like) or a processor to execute some of the steps of the methods described in the various embodiments of the present disclosure. The preceding storage medium includes any medium that can store program codes, such as a USB flash disk, a mobile hard disk, a read-only memory (ROM), a random access memory (RAM), a magnetic disk, or an optical disk.

What is claimed is:

1. A wireless communication device, comprising: a radio frequency chip and a computing power chip;

wherein the radio frequency chip comprises a first processor and a radio frequency transceiver, the first processor is connected with the radio frequency transceiver, and the first processor is configured to control sending and reception of the radio frequency transceiver; the computing power chip comprises a second processor; the radio frequency chip and the computing power chip are connected via a preset communication interface, so that the first processor communicates with the second processor;

wherein the second processor is configured to: perform a processing of decoding first encoded voice data received by the radio frequency transceiver to obtain decoded voice data; and perform a processing of encoding voice data to be sent to obtain second encoded voice data, and transmit the second encoded voice data to the radio frequency transceiver for sending the second encoded voice data, wherein the wireless communication device is a Digital Enhanced Cordless Telecommunications (DECT) base station, a DECT headset, or a DECT handset, wherein the first processor includes an Advanced Reduced Instruction Set Computing (RISC) Machines (ARM) processor and the second processor includes a Digital Signal Processor (DSP), wherein the radio frequency chip is further configured to control the computing power chip to stop or start an encoding or decoding processing.

2. The wireless communication device according to claim 1, further comprising: a converter and a voice player, wherein the converter is connected with the second processor and the voice player respectively; and the converter is configured to perform digital-to-analog conversion on the decoded voice data decoded by the second processor so as to obtain analog voice data to be played, which is then played by the voice player.

3. The wireless communication device according to claim 2, further comprising: a voice capturer; wherein the converter is also connected with the voice capturer; and the converter is further configured to perform analog-to-digital conversion on analog voice data acquired by the voice capturer so as to obtain the voice data to be sent, and transmit the voice data to be sent to the second processor.

4. The wireless communication device according to claim 3, wherein the converter is located on the computing power chip;

a digital input end of the converter is connected with the second processor, and an analog output end of the converter is connected with the voice player; and an analog input end of the converter is connected with the voice capturer, and a digital output end of the converter is connected with the second processor.

5. The wireless communication device according to claim 3, wherein the converter is located on the radio frequency chip;

a digital input end and a digital output end of the converter are connected with the first processor of the radio frequency chip, respectively, so that the converter communicates with the second processor on the computing power chip; and an analog output end of the converter is connected with the voice player, and an analog input end of the converter is also connected with the voice capturer.

6. The wireless communication device according to claim 1, wherein the second processor is configured to perform noise reduction and/or echo cancellation on the voice data to be sent and then perform encoding on the voice data to be sent.

7. The wireless communication device according to claim 1, wherein the preset communication interface is a serial peripheral interface (SPI) or a time division multiplexing (TDM) interface.

8. The wireless communication device according to claim 1, wherein the radio frequency transceiver performs wireless communication according to any one of the following communication standards: DECT (Digital Enhanced Cordless Telecommunications), Bluetooth, Wireless Fidelity (WiFi), Global System for Mobile Communications (GSM), Long Term Evolution (LTE), World Interoperability for Microwave Access (Wimax), Third Generation Mobile Networks (3G), the 4th Generation Mobile Networks (4G), and the 5th Generation Mobile Networks (5G).

9. A method for processing voice data, characterized by being applicable to the second processor in the wireless communication device according to claim 1, the method comprising:

receiving first encoded voice data from the radio frequency transceiver;

performing a processing of decoding the first encoded voice data to obtain decoded voice data;

performing a processing of encoding voice data to be sent to obtain second encoded voice data; and transmitting the second encoded voice data to the radio frequency transceiver for sending the second encoded voice data, wherein the first processor includes an Advanced Reduced Instruction Set Computing (RISC) Machines (ARM) processor and the second processor includes a Digital Signal Processor (DSP), wherein the radio frequency chip is further configured to control the computing power chip to stop or start an encoding or decoding processing.

10. The method according to claim 9, further comprising:

receiving a codec start instruction sent by the first processor, wherein the codec start instruction is sent by the first processor when the first processor receives a call establishment request; and starting a processing of encoding or decoding voice data according to the codec start instruction.

11. The method according to claim 9, further comprising:

receiving a codec stop instruction sent by the first processor, wherein the codec stop instruction is sent by the first processor when the first processor receives a call end request; and stopping a processing of encoding or decoding voice data according to the codec stop instruction.

12. The method according to claim 9, characterized in that performing the processing of encoding voice data to be sent to obtain second encoded voice data comprises:

performing noise reduction and/or echo cancellation on the voice data to be sent and then encoding the voice data to be sent so as to obtain the second encoded voice data.

13. The wireless communication device according to claim 9, wherein the encoding and decoding are performed by the second processor using a voice codec algorithm including at least one of a LC3plus algorithm, an Opus algorithm and a G.722.1 algorithm.

14. An apparatus for processing voice data, characterized by being applicable to the second processor in the wireless communication device according to claim 1, the apparatus comprising:

a receiving module configured to receive first encoded voice data from the radio frequency transceiver;

a decoding module configured to perform a processing of decoding the first encoded voice data to obtain decoded voice data;

an encoding module configured to perform a processing of encoding voice data to be sent to obtain second encoded voice data; and a transmission module configured to transmit the second encoded voice data to the radio frequency transceiver for sending the second encoded voice data, wherein the first processor includes an Advanced Reduced Instruction Set Computing (RISC) Machines (ARM) processor and the second processor includes a Digital Signal Processor (DSP), wherein the radio frequency chip is further configured to control the computing power chip to stop or start an encoding or decoding processing.

15. The wireless communication device according to claim 14, wherein the encoding and decoding are performed by the second processor using a voice codec algorithm including at least one of a LC3plus algorithm, an Opus algorithm and a G.722.1 algorithm.

16. The wireless communication device according to claim 1, wherein the radio frequency transceiver includes a Digital Enhanced Cordless Telecommunications-Radio Frequency (DECT-RF) transceiver, and the converter includes an integrated circuit chip for analog-to-digital conversion and digital-to-analog conversion (ADC&DAC).

17. The wireless communication device according to claim 1, wherein the encoding and decoding are performed by the second processor using a voice codec algorithm including at least one of a LC3plus algorithm, an Opus algorithm and a G.722.1 algorithm.

* * * * *